F. HACHMANN.
WASHER FOR HOSE COUPLINGS.
APPLICATION FILED JAN. 27, 1919.

1,329,398.

Patented Feb. 3, 1920.

Inventor
Frederick Hachmann
by Edward E. Longan
Atty.

of the sections.

UNITED STATES PATENT OFFICE.

FREDERICK HACHMANN, OF ST. LOUIS, MISSOURI, ASSIGNOR OF ONE-EIGHTH TO DAVID M. HUTCHINSON, OF FERGUSON, MISSOURI.

WASHER FOR HOSE-COUPLINGS.

1,329,398.  Specification of Letters Patent.  Patented Feb. 3, 1920.

Application filed January 27, 1919. Serial No. 273,406.

*To all whom it may concern:*

Be it known that I, FREDERICK HACHMANN, a citizen of the United States, and resident of the city of St. Louis and State of Missouri, have invented certain new and useful Improvements in Washers for Hose-Couplings, of which the following is a specification, containing a full, clear, and exact description, reference being had to accompanying drawings, forming a part thereof.

My invention relates to certain new and useful improvements in washers for hose couplings and the like and has for its primary object the construction of a washer which, when inserted in the coupling or wherever it may be desired to use the same, will not fall out.

Figure 1:
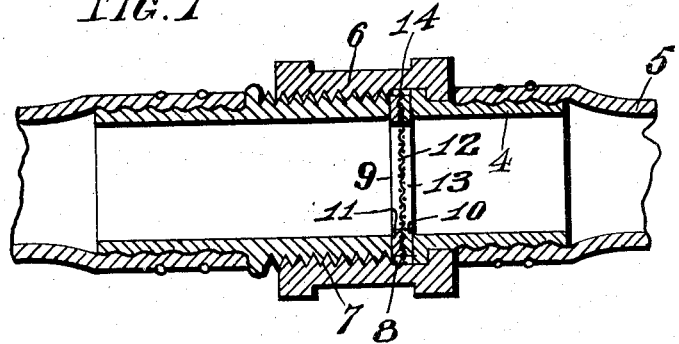
Figure 1 is a longitudinal section of an ordinary hose coupling showing my invention applied in use.
Figure 2:
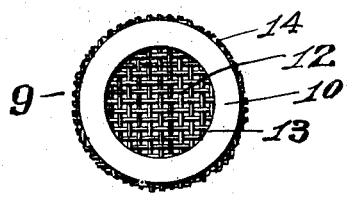
Fig. 2 is a plan view of the washer.
Figure 3:
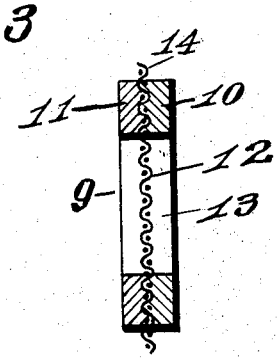
Fig. 3 is an enlarged diametrical section of the same.

Referring to the drawings, 4 indicates one of the coupling members which may be of any desired construction. 5 is a section of a hose applied thereto in any desirable manner. 6 indicates a screw-threaded coupling member which is adapted to receive another section of hose. Said member 6 is provided on its inside with the usual screw-thread 7 and a groove 8 below the screw threads.

9 indicates my improved washer which is composed of two sections 10 and 11 of any desired size and between which is located a disk of reticulated material 12. This disk is preferably made of wire screening and is of a diameter somewhat greater than the diameter of the sections 10 and 11, so that, when said disk 12 is inserted between said sections, the periphery thereof will project beyond said sections to afford clamping or engaging means for holding the same in the coupling.

Sections 10 and 11 are secured together preferably by vulcanizing, or may be secured together by any other adhesive waterproof or impervious material, the only requirement being that the wire screening, out of which the disk 12 is formed, should be thoroughly embedded in the contacting faces of the sections 10 and 11. In the preferred form, the disk 12 of reticulated material extends across the usual opening 13 in the washer, which performs the function of a strainer when the washer is in use.

When the washer has been constructed as previously described, the same is seated in the coupling member 6, and the projecting peripheral portion 14 of the disk 12 is seated in the usual groove 8; that is to say, it is sprung in, as the peripheral portion 14 is formed, as it were, of a kind of flexible flange, and when the washer is seated in the coupling, this flexible wire flange will prevent the same from working out of the coupling in the ordinary use of the same.

The primary object of my invention as previously stated, is to construct a washer which, when applied for use, will not work out of position and become lost, and is especially designed and useful as a washer for hose couplings.

Having fully described my invention, what I claim is:

A washer for hose couplings and the like, composed of two sections of rubber or analogous material, and a disk of reticulated wire material located between said sections and held in place by vulcanizing said sections together, the periphery of the disk of reticulated material projecting beyond the periphery of the sections.

In testimony whereof I have signed my name to this specification in presence of two subscribing witnesses.

FREDERICK HACHMANN.

Witnesses:
ELIZABETH CARTALL,
EDWARD E. LONGAN.